US010626786B2

(12) United States Patent
Uchida et al.

(10) Patent No.: US 10,626,786 B2
(45) Date of Patent: Apr. 21, 2020

(54) IN-COMBUSTION CHAMBER FLOW CONTROL DEVICE

(71) Applicant: MAZDA MOTOR CORPORATION, Hiroshima (JP)

(72) Inventors: Kenji Uchida, Hiroshima (JP); Takeshi Nagasawa, Hiroshima (JP); Ryohei Ono, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/085,617

(22) PCT Filed: Mar. 29, 2017

(86) PCT No.: PCT/JP2017/012894
§ 371 (c)(1),
(2) Date: Sep. 17, 2018

(87) PCT Pub. No.: WO2017/170693
PCT Pub. Date: Oct. 5, 2017

(65) Prior Publication Data
US 2019/0145307 A1     May 16, 2019

(30) Foreign Application Priority Data

Mar. 31, 2016 (JP) .................. 2016-070470

(51) Int. Cl.
*F02B 17/00*     (2006.01)
*F02M 27/04*     (2006.01)
(Continued)

(52) U.S. Cl.
CPC .......... *F02B 23/104* (2013.01); *F02B 17/005* (2013.01); *F02B 31/00* (2013.01);
(Continued)

(58) Field of Classification Search
CPC ...... F02B 17/00; F02B 17/005; F02B 23/104; F02B 2023/106; F02B 2023/107; F02B 2275/48; F02M 27/042; F02M 29/06
(Continued)

(56) References Cited

U.S. PATENT DOCUMENTS 9,821,862 B2 *  11/2017  Han .................. B62D 35/00
9,835,122 B2 *  12/2017  Ito .................... F02D 33/006
(Continued)

FOREIGN PATENT DOCUMENTS

DE    102013005203 A1    9/2014
JP    2001-342836 A      12/2001
(Continued)

OTHER PUBLICATIONS

International Search Report issued in PCT/JP2017/012894; dated Jun. 6, 2017.
(Continued)

*Primary Examiner* — Erick R Solis
(74) *Attorney, Agent, or Firm* — Studebaker & Brackett PC

(57) ABSTRACT

Provided is an in-combustion chamber flow control device used in an engine having an intake passage connected to an intake opening formed in a ceiling surface of a combustion chamber, at an angle inclined with respect to a direction of an axis of a cylinder. This in-combustion chamber flow control device comprises a plasma actuator (28) disposed inside the combustion chamber (16). The plasma actuator comprises: a dielectric body (38) disposed along the ceiling surface (16a) of the combustion chamber, at a position closer to a center of the ceiling surface than the intake opening (18a); an exposed electrode (40) disposed on one side of the dielectric body facing the combustion chamber; and an embedded electrode (42) disposed on a side opposite to the
(Continued)

exposed electrode across the dielectric body. The embedded electrode is disposed at a position closer to the intake opening than the exposed electrode.

8 Claims, 6 Drawing Sheets

(51) Int. Cl.
    *F02M 29/06*     (2006.01)
    *F02B 23/10*     (2006.01)
    *F02D 45/00*     (2006.01)
    *F02D 43/00*     (2006.01)
    *F02B 31/00*     (2006.01)
    *F02B 31/02*     (2006.01)

(52) U.S. Cl.
    CPC .............. *F02B 31/02* (2013.01); *F02D 43/00* (2013.01); *F02D 45/00* (2013.01); *F02M 27/042* (2013.01); *F02B 2023/106* (2013.01); *F02B 2023/107* (2013.01); *F02B 2275/48* (2013.01); *F02M 29/06* (2013.01); *Y02T 10/125* (2013.01); *Y02T 10/146* (2013.01)

(58) Field of Classification Search
    USPC .................................. 123/301, 305, 306, 309
    See application file for complete search history.

(56) References Cited

U.S. PATENT DOCUMENTS

| | | | | |
|---|---|---|---|---|
| 9,951,800 | B2* | 4/2018 | Segawa | ................. F04D 29/681 |
| 10,247,163 | B2* | 4/2019 | Kinoshita | ............... F02P 1/005 1/5 |
| 2002/0078919 | A1 | 6/2002 | Yasuoka et al. | |
| 2011/0031886 | A1* | 2/2011 | Ikeda | ........................ F01L 3/02 315/111.21 |
| 2012/0152198 | A1* | 6/2012 | Kim | ...................... B62D 35/00 123/188.1 |
| 2016/0069305 | A1 | 3/2016 | Ito | |

FOREIGN PATENT DOCUMENTS

| | | |
|---|---|---|
| JP | 2003-003854 A | 1/2003 |
| JP | 2010-101174 A | 5/2010 |
| JP | 2012-180799 A | 9/2012 |
| JP | 2014-214851 A | 11/2014 |
| JP | 2015-187415 A | 10/2015 |

OTHER PUBLICATIONS

An Office Action; "Notification of Reasons for Rejection," mailed by the Japanese Patent Office dated Nov. 13, 2017, which corresponds to Japanese Patent Application No. 2016-070470.

Written Opinion of the International Searching Authority issued in corresponding International Application No. PCT/JP2017/012894; dated Jun. 6, 2017.

Extended European Search Report issued by the European Patent Office dated Nov. 20, 2018, which corresponds to EP17775227.6-1004 and is related to U.S. Appl. No. 16/085,617.

Communication pursuant to Article 94(3) EPC issued by the European Patent Office dated Dec. 16, 2019, which corresponds to European Patent Application No. 17 775 227.6-1004 and is related to U.S. Appl. No. 16/085,617.

* cited by examiner

IN-COMBUSTION CHAMBER FLOW CONTROL DEVICE

TECHNICAL FIELD

The present invention relates to an in-combustion chamber flow control device, and more particularly to an in-combustion chamber flow control device used in an engine having an intake passage connected to an intake opening formed in a ceiling surface of a combustion chamber, at an angle inclined with respect to a direction of an axis of a cylinder, wherein the in-combustion chamber flow control device is designed to control a flow of gas in the combustion chamber.

BACKGROUND ART

Heretofore, it has been attempted to achieve an improvement in combustion of an engine by controlling a flow, such as a tumble flow or a swirl flow, of gas in a combustion chamber. For example, there has been known a technique of causing an air-fuel mixture to be gathered within a piston cavity or to be transferred to the vicinity of an electrode of a spark plug, in a spark-ignited direct-fuel injection engine (see, for example, Patent Document 1).

CITATION LIST

Patent Document

Patent Document 1: JP 2001-342836A

SUMMARY OF INVENTION

Technical Problem

Meanwhile, in order to improve efficiency of an engine, it is necessary to reduce cooling loss. However, if a tumble flow is generated in an intake stroke as in the engine described in the Patent Document 1, vortexes due to the tumble flow remain in a compression stroke, and, under the influence of the vortexes, the air-fuel mixture is unevenly distributed toward a side of an exhaust opening with respect to a center of the cavity, at a timing around top dead center of the compression stroke. As a result, high-temperature gas comes close to a piston cavity wall, resulting in undesirably increased cooling loss.

Further, in an engine configured to inject fuel into a combustion chamber during a compression stroke, if vortexes due to a tumble flow still remain in the compression stroke, as mentioned above, a rise in temperature of in-cylinder gas along with a rise in pressure is suppressed due to convection heat transfer between the in-cylinder gas and a cylinder wall, so that vaporization of the fuel injected during the compression stroke is not sufficiently promoted, resulting in failing to improve combustion stability.

The present invention has been made in view of solving the above conventional problems, and an object thereof is to provide an in-combustion chamber flow control device used in an engine having an intake passage connected to an intake opening formed in a ceiling surface of a combustion chamber, at an angle inclined with respect to a direction of an axis of a cylinder, wherein the in-combustion chamber flow control device is capable of reducing cooling loss due to a tumble flow and promoting a rise in temperature of in-cylinder gas during a compression stroke of the cylinder.

Solution to Technical Problem

In order to achieve the above object, according to a first aspect of the present invention, there is provided an in-combustion chamber flow control device used in an engine comprising a cylindrical cylinder, a piston received in the cylinder slidably with respect to an inner surface of the cylinder, and a cylinder head which is internally formed with an intake passage connected to an intake opening formed in a ceiling surface of a combustion chamber defined by the cylinder head, the cylinder and the piston, at an angle inclined with respect to a direction of an axis of the cylinder, wherein the in-combustion chamber flow control device is designed to control a flow of gas in the combustion chamber. The in-combustion chamber flow control device is characterized in that it comprises a plasma actuator disposed inside the combustion chamber, the plasma actuator comprising: a dielectric body disposed along the ceiling surface at a position closer to a center of the ceiling surface than the intake opening; an exposed electrode disposed on one side of the dielectric body facing the combustion chamber; and an embedded electrode disposed on a side opposite to the exposed electrode across the dielectric body, the embedded electrode being disposed at a position closer to the intake opening than the exposed electrode.

In the in-combustion chamber flow control device according to the first aspect of the present invention, in the plasma actuator, the exposed electrode is disposed on the combustion chamber-facing side of the dielectric body disposed along the ceiling surface of the combustion chamber, and the embedded electrode is disposed on the side opposite to the exposed electrode across the dielectric body, at a position closer to the intake opening than the exposed electrode, so that it becomes possible to generate plasma in a discharge space between an edge face of the exposed electrode and the dielectric body, by applying a high-frequency and high-voltage AC voltage between the exposed electrode and the embedded electrode during an intake stroke during which a tumble flow is generated, and, based on a body force (volume force) produced by the plasma, induce a flow flowing along the ceiling surface of the combustion chamber in a direction from the exposed electrode toward the intake opening. That is, it becomes possible to generate a flow in a direction causing the generated flow to cancel out a tumble flow formed by intake air flowing from the intake opening into the combustion chamber toward an exhaust opening, and thus, in a compression stroke, suppress vortexes due to the tumble flow to moderate the flow rate of gas in the vicinities of an inner wall surface of the cylinder and the piston top surface, thereby suppressing convection heat transfer between in-cylinder gas and each of the inner wall surface of the cylinder and the piston top surface to promote a rise in temperature of the in-cylinder gas during the compression stroke.

Further, because the compression stroke is progressed in the state in which vortexes due to the tumble flow are suppressed, an air-fuel mixture can be located in a central region of the combustion chamber at a timing around top dead center of the compression stroke. This makes it possible to reduce cooling loss due to convection heat transfer from high-temperature gas to the wall surface of the combustion chamber and the piston top surface, caused by the tumble flow.

Preferably, in the in-combustion chamber flow control device according to the first aspect of the present invention, each of the exposed electrode and the embedded electrode is disposed to extend along a radial direction of the combustion chamber, in a region between the intake opening and an exhaust opening formed in the ceiling surface of the combustion chamber.

According to this feature, each of the exposed electrode and the embedded electrode is disposed to extend along the radial direction of the combustion chamber, in the region between the intake opening and the exhaust opening. Thus, by applying a high-frequency and high-voltage AC voltage between the exposed electrode and the embedded electrode during an intake stroke during which a tumble flow is generated, a flow of intake air flowing from the intake opening into the combustion chamber toward the exhaust opening can be suppressed over the entire ceiling surface of the combustion chamber. This makes it possible to more effectively suppress vortexes due to the tumble flow.

According to a second aspect of the present invention, there is provided. An in-combustion chamber flow control device used in an engine comprising a cylindrical cylinder, a piston received in the cylinder slidably with respect to an inner surface of the cylinder, and a cylinder head which is internally formed with an intake passage connected to an intake opening formed in a ceiling surface of a combustion chamber defined by the cylinder head, the cylinder and the piston, at an angle inclined with respect to a direction of an axis of the cylinder, wherein the in-combustion chamber flow control device is designed to control a flow of gas in the combustion chamber. The in-combustion chamber flow control device is characterized in that it comprises a plasma actuator disposed inside the combustion chamber, the plasma actuator comprising: a dielectric body disposed along a piston top surface of the piston of the engine; an exposed electrode disposed on one side of the dielectric body facing the combustion chamber; and an embedded electrode disposed on a side opposite to the exposed electrode across the dielectric body, the embedded electrode being disposed at a position closer to one end of the piston top surface on the side of an exhaust opening, than the exposed electrode.

In the in-combustion chamber flow control device according to the second aspect of the present invention, in the plasma actuator, the exposed electrode is disposed on the combustion chamber-facing side of the dielectric body disposed along the piston top surface, and the embedded electrode is disposed on the side opposite to the exposed electrode across the dielectric body, at a position closer to one end of the piston top surface on the side of an exhaust opening, than the exposed electrode, so that it becomes possible to generate plasma in a discharge space between an edge face of the exposed electrode and the dielectric body, by applying a high-frequency and high-voltage AC voltage between the exposed electrode and the embedded electrode during an intake stroke during which a tumble flow is generated, and, based on a body force produced by the plasma, induce a flow flowing along the piston top surface in a direction from the exposed electrode toward the exhaust opening-side end of the piston top surface. That is, it becomes possible to generate a flow in a direction causing the generated flow to cancel out a tumble flow flowing along the piton top surface in a direction from the exhaust opening-side end of the piston top surface toward the other, intake opening-side, end of the piston top surface, and thus, in a compression stroke, suppress vortexes due to the tumble flow to moderate the flow rate of gas in the vicinities of an inner wall surface of the cylinder and the piston top surface, thereby suppressing convection heat transfer between in-cylinder gas and each of the inner wall surface of the cylinder and the piston top surface to promote a rise in temperature of the in-cylinder gas during the compression stroke.

Further, because the compression stroke is progressed in the state in which vortexes due to the tumble flow are suppressed, an air-fuel mixture can be located in a central region of the combustion chamber at a timing around top dead center of the compression stroke. This makes it possible to reduce cooling loss due to convection heat transfer from high-temperature gas to the wall surface of the combustion chamber and the piston top surface, caused by the tumble flow.

Preferably, in the in-combustion chamber flow control device according to the second aspect of the present invention, each of the exposed electrode and the embedded electrode is disposed at a position closer to the one end of the piston top surface on the side of the exhaust opening, than to a center of the piston top surface.

According to this feature, each of the exposed electrode and the embedded electrode is disposed at a position closer to the exhaust opening-side end of the piston top surface than to a center of the piston top surface, so that, by applying a high-frequency and high-voltage AC voltage between the exposed electrode and the embedded electrode during an intake stroke during which a tumble flow is generated, a tumble flow turning around from a region of the inner wall surface of the cylinder on the side of an exhaust opening toward the exhaust opening-side end of the piston top surface and then flowing along the piston top surface toward the other, intake opening-side, end of the piston top surface can be suppressed at a position where the tumble flow has a relatively high flow rate. This makes it possible to more effectively suppress vortexes due to the tumble flow.

According to a third aspect of the present invention, there is provided an in-combustion chamber flow control device used in an engine comprising a cylindrical cylinder, a piston received in the cylinder slidably with respect to an inner surface of the cylinder, and a cylinder head which is internally formed with an intake passage connected to an intake opening formed in a ceiling surface of a combustion chamber defined by the cylinder head, the cylinder and the piston, at an angle inclined with respect to a direction of an axis of the cylinder, wherein the in-combustion chamber flow control device is designed to control a flow of gas in the combustion chamber. The in-combustion chamber flow control device is characterized in that it comprises: a plasma actuator disposed along the ceiling surface of the combustion chamber, at a position closer to a center of the ceiling surface than the intake opening; and a control means to control the plasma actuator, wherein the control means is operable to control the plasma actuator to generate a flow flowing along the ceiling surface in a direction from the plasma actuator toward the intake opening, during an intake stroke of the engine.

In the in-combustion chamber flow control device according to the third aspect of the present invention, the control means is operable to control the plasma actuator disposed along the ceiling surface of the combustion chamber, at a position closer to the center of the ceiling surface than the intake opening, to generate a flow flowing along the ceiling surface of the combustion chamber in a direction from the plasma actuator toward the intake opening, during an intake stroke during which a tumble flow is generated. Thus, it becomes possible to generate a flow in a direction causing the generated flow to cancel out a tumble flow formed by intake air flowing from the intake opening into the combustion chamber toward the exhaust opening, and thus, in a compression stroke, suppress vortexes due to the tumble flow to moderate the flow rate of gas in the vicinities of an inner wall surface of the cylinder and the piston top surface, thereby suppressing convection heat transfer between in-cylinder gas and each of the inner wall surface of the cylinder and the piston top surface to promote a rise in temperature of the in-cylinder gas during the compression stroke.

Further, because the compression stroke is progressed in the state in which vortexes due to the tumble flow are suppressed, an air-fuel mixture can be located in a central region of the combustion chamber at a timing around top dead center of the compression stroke. This makes it possible to reduce cooling loss due to convection heat transfer from high-temperature gas to the wall surface of the combustion chamber and the piston top surface, caused by the tumble flow.

According to a fourth aspect of the present invention, there is provided. An in-combustion chamber flow control device used in an engine comprising a cylindrical cylinder, a piston received in the cylinder slidably with respect to an inner surface of the cylinder, and a cylinder head which is internally formed with an intake passage connected to an intake opening formed in a ceiling surface of a combustion chamber defined by the cylinder head, the cylinder and the piston, at an angle inclined with respect to a direction of an axis of the cylinder, wherein the in-combustion chamber flow control device is designed to control a flow of gas in the combustion chamber. The in-combustion chamber flow control device is characterized in that it comprises: a plasma actuator disposed along a piston top surface of the piston of the engine; and a control means to control the plasma actuator, wherein the control means is operable to control the plasma actuator to generate a flow flowing along the piston top surface in a direction from the plasma actuator toward one end of the piston top surface on the side of an exhaust opening, during an intake stroke of the engine.

In the in-combustion chamber flow control device according to the fourth aspect of the present invention, the control means is operable to control the plasma actuator disposed along the piston top surface to generate a flow flowing along the piston top surface in a direction from the plasma actuator toward the exhaust opening-side end of the piston top surface during an intake stroke during which a tumble flow is generated. Thus, it becomes possible to generate a flow in a direction causing the generated flow to cancel out a tumble flow flowing along the piton top surface in a direction from the exhaust opening-side end of the piston top surface toward the other, intake opening-side, end of the piston top surface, and thus, in a compression stroke, suppress vortexes due to the tumble flow to moderate the flow rate of gas in the vicinities of an inner wall surface of the cylinder and the piston top surface, thereby suppressing convection heat transfer between in-cylinder gas and each of the inner wall surface of the cylinder and the piston top surface to promote a rise in temperature of the in-cylinder gas during the compression stroke.

Further, because the compression stroke is progressed in the state in which vortexes due to the tumble flow are suppressed, an air-fuel mixture can be located in a central region of the combustion chamber at a timing around top dead center of the compression stroke. This makes it possible to reduce cooling loss due to convection heat transfer from high-temperature gas to the wall surface of the combustion chamber and the piston top surface, caused by the tumble flow.

Preferably, in the in-combustion chamber flow control device according to any one of the first to fourth aspects of the present invention, the engine is provided with a fuel injection valve for injecting fuel directly into the cylinder, and a fuel injection valve control device for controlling the fuel injection valve to inject fuel toward a center of a cavity formed in the piston top surface in a downwardly concaved manner, and wherein the in-combustion chamber flow control device is designed to control a flow of gas in the combustion chamber.

According to this feature, in the engine configured such that fuel is injected toward the center of the cavity, the compression stroke is progressed in the state in which vortexes due to the tumble flow are suppressed. Thus, an air-fuel mixture can be located in the center of the cavity at a timing around top dead center of the compression stroke, so that it becomes possible to more reliably reduce the cooling loss due to convection heat transfer from high-temperature gas to a wall surface of the cavity caused by the tumble flow.

Preferably, in the above in-combustion chamber flow control device, a reachable distance of fuel injected from the fuel injection valve is less than a distance between the fuel injection valve and a wall surface of the cavity.

According to this feature, injected fuel is disposed at a position spaced apart from the wall surface of the cavity by a given distance, and the compression stroke is progressed in the state in which vortexes due to the tumble flow are suppressed. Thus, an air-fuel mixture can be located in the center of the cavity at a timing around top dead center of the compression stroke, so that it becomes possible to more reliably reduce the cooling loss due to convection heat transfer from high-temperature gas to the wall surface of the cavity caused by the tumble flow.

Effect of Invention

The in-combustion chamber flow control device of the present invention used in an engine having an intake passage connected to an intake opening formed in a ceiling surface of a combustion chamber, at an angle inclined with respect to a direction of an axis of a cylinder can reduce cooling loss due to a tumble flow and promote a rise in temperature of in-cylinder gas during a compression stroke of the cylinder.

DESCRIPTION OF EMBODIMENTS

With reference to the accompanying drawings, an in-combustion chamber flow control device according to one embodiment of the present invention will now be described.

Figure 1:
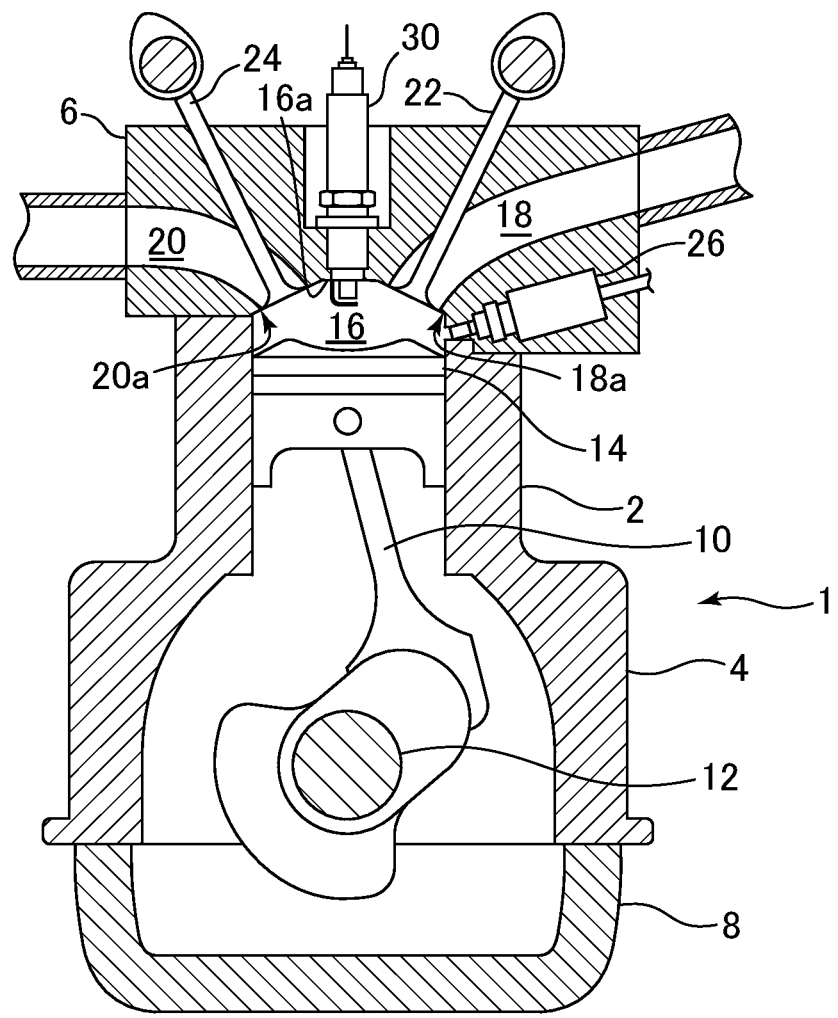
FIG. 1 is a schematic configuration diagram of an engine employing an in-combustion chamber flow control device according to one embodiment of the present invention.
Figure 2:
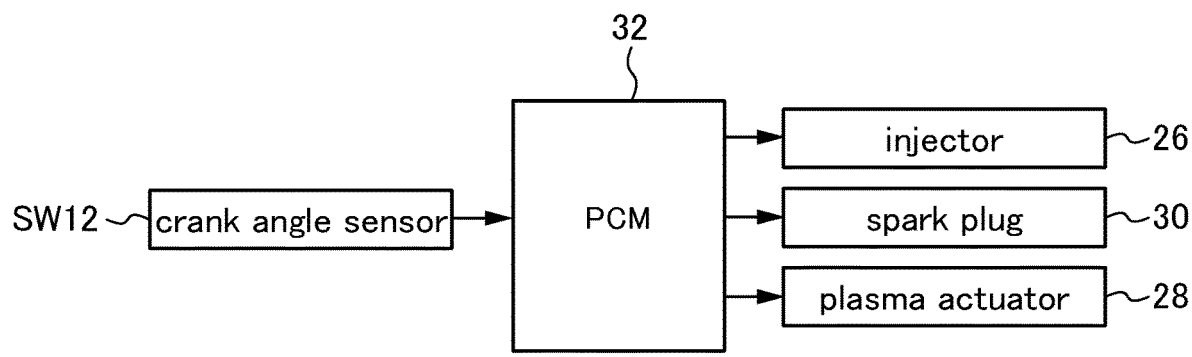
FIG. 2 is a block diagram depicting an electrical configuration regarding the in-combustion chamber flow control device according to this embodiment.

First of all, the configuration of an engine employing the device according to this embodiment will be described with reference to FIGS. 1 and 2. FIG. 1 is a schematic configuration diagram of an engine employing the in-combustion chamber flow control device according to this embodiment, and FIG. 2 is a block diagram depicting an electrical configuration regarding the in-combustion chamber flow control device according to this embodiment.

In FIG. 1, the reference sign 1 designates an engine. This engine 1 is a gasoline engine which is mounted to a vehicle and configured to be supplied with fuel containing at least gasoline. The engine 1 comprises: a cylinder block 4 provided with a plurality of cylindrical cylinders 2 (although FIG. 1 depicts only one cylinder 2, a plurality of, e.g., four, cylinders 2 are actually provided in an in-line arrangement); a cylinder head 6 disposed on the top of the cylinder block 4; and an oil pan 8 disposed under the cylinder block 4 and storing lubricant therein. Each of the cylinders 2 is provided with a piston 14 which is connected to a crankshaft 12 via a connecting rod 10, and fittingly inserted in the cylinder 2 reciprocatingly movably and slidably with respect to an inner peripheral surface of the cylinder 2. The cylinder head 6, the cylinder 2 and the piston 14 define a combustion chamber 16. Here, it should be noted that the shape of the combustion chamber 16 is not limited to the depicted shape. For example, the shape of a piston top surface of the piston 14, the shape of a ceiling surface of the combustion chamber 16 and the like may be appropriately changed.

With respect to each of the cylinders 2, the cylinder head 6 is formed with two mutually independent intake ports 18 and two mutually independent exhaust ports 20, wherein each of the intake ports 18 and each of the exhaust ports 20 are provided, respectively, with an intake valve 22 and an exhaust valve 24 each for selectively opening and closing a corresponding one of an intake opening 18a of the intake port 18 and an exhaust opening 20a of the exhaust port 20 each formed on the side of the combustion chamber 16. The intake port 18 is connected to the intake opening 18a at an angle inclined with respect to a direction of an axis of the cylinder 2.

A lower surface of the cylinder head 6 defines the ceiling surface 16a of the combustion chamber 16 (combustion chamber ceiling surface 16a). This ceiling surface 16a is formed in a so-called pent-roof shape having two inclined surfaces extending, respectively, in a direction from a central region of the ceiling surface 16a toward the intake openings 18a and in a direction from the central region toward the exhaust openings 20a, so as to reach a bottom of the cylinder head 6.

With respect to each of the cylinders 2, the cylinder head 6 is provided with an injector 26 (fuel injection valve) for injecting fuel directly into the cylinder 2. The injector 26 is disposed to extend obliquely downwardly, such that a nozzle hole thereof faces the inside of the combustion chamber 16, from between the two intake ports 18 in a peripheral region of the ceiling surface 16a of the combustion chamber 16. This injector 26 is operable to inject fuel directly into the combustion chamber 16, at an injection timing set according to an operating state of the engine 1 and in an amount according to the operating state of the engine 1.

With respect to each of the cylinders 2, the cylinder head 6 is further provided with a spark plug 30 for forcibly igniting an air-fuel mixture in the combustion chamber 16. The spark plug 30 is disposed to penetrate through the cylinder head 6, such that it extends obliquely downwardly from the central region of the ceiling surface 16a of the combustion chamber 16.

In a central region of the piston top surface 14a, a cavity 34 approximately circularly concaved in top plan view is formed. The spark plug 30 is disposed such that a distal end thereof faces within the cavity when the piston 14 is located at a top dead center position. This forms an approximately spherical combustion space having a center at the distal end of the spark plug 30.

Further, a plasma actuator 28 is installed on each of the combustion chamber ceiling surface 16a and the piston top surface 14a. Details of the plasma actuator 28 will be described later.

The engine 1 is configured to be controlled by a powertrain control module (hereinafter referred to as "PCM") 32. The PCM 32 is composed of a microprocessor comprising a CPU, a memory, a counter timer group, an interface, and paths connecting these units. This PCM 32 forms a controller.

The PCM 32 is configured to accept an input of various detection signals including a detection signal of a crank angle sensor SW12 for detecting a rotational angle of the crankshaft 12, as depicted in FIG. 2.

The PCM 32 is operable to perform various calculations based on the detection signals to thereby determine states of the engine 1 and the vehicle, and output control signals, respectively, to actuators of the injector 26, the spark plug 30, the plasma actuator 28, and various valves (a throttle valve, an EGR valve, etc.). In this way, the PCM 32 operates to control the operation of the engine 1. A combination of the plasma actuator 28 and the PCM 32 are equivalent to "in-combustion chamber flow control device" set forth in the appended claims, and the PCM 32 functions as a control means to control the plasma actuator and a fuel injection valve control device for controlling the injector 26, although details thereof will be described later.

Figure 3:
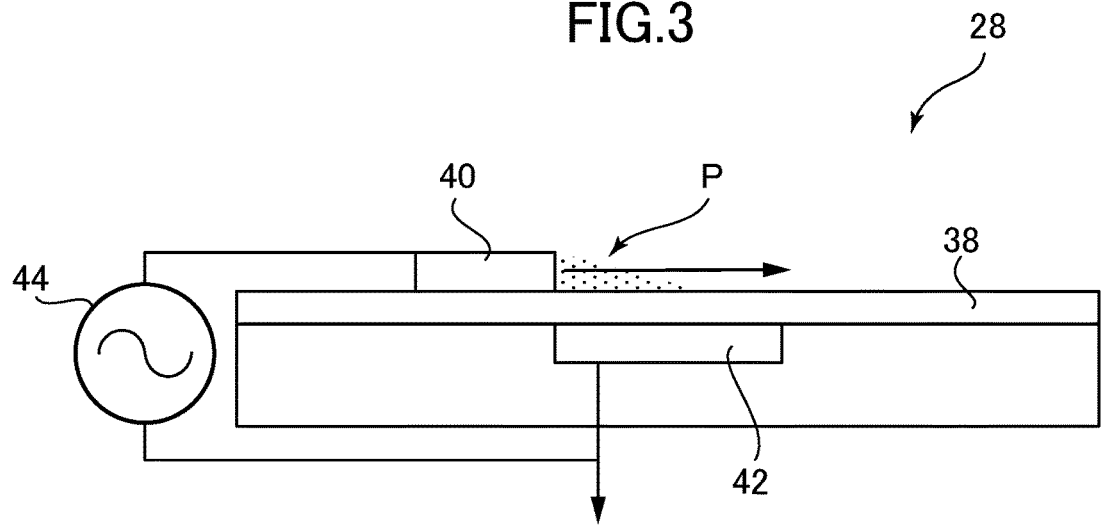
FIG. 3 is a conceptual diagram depicting a basic configuration of a plasma actuator in this embodiment.

Next, with respect to FIG. 3, a basic configuration of the plasma actuator 28 in this embodiment will be described. FIG. 3 is a conceptual diagram depicting the basic configuration of the plasma actuator 28 in this embodiment.

As depicted in FIG. 3, the plasma actuator 28 comprises: a thin film-shaped dielectric body 38; and an exposed electrode 40 and an embedded electrode 42 which are arranged across the dielectric body. The exposed electrode 40 and the embedded electrode 42 are arranged such that they are positionally offset along a planar direction (a direction parallel to a principal surface, or an in-plane direction) of the dielectric body 38. In FIG. 3, the exposed electrode 40 and the embedded electrode 42 are arranged such that they do not overlap each other in a direction normal to a principal surface of the dielectric body 38. Alternatively, the exposed electrode 40 and the embedded electrode 42 may be arranged in a partially overlapping manner. Each of the exposed electrode 40 and the embedded electrode 42 is connected to an AC power supply 44.

When a high-frequency and high-voltage AC voltage (e.g., about several kHz, or about several ten kV) is applied between the exposed electrode 40 and the embedded electrode 42 by the AC power supply 44, a plasma P is generated in a discharge space between an edge face of the exposed electrode 40 and the dielectric body 38, as depicted in FIG. 3. The plasma P produces a body force (volume force) directed in a direction from the exposed electrode 40 toward the embedded electrode 42, so that, based on the body force, a flow of gas (indicated by the arrowed line in FIG. 3) flowing along the surface of the dielectric body 38 is induced.

The magnitude of the body force to be produced by the plasma P can be controlled by a voltage and a frequency to be applied between the exposed electrode 40 and the embedded electrode 42.

Figure 4:
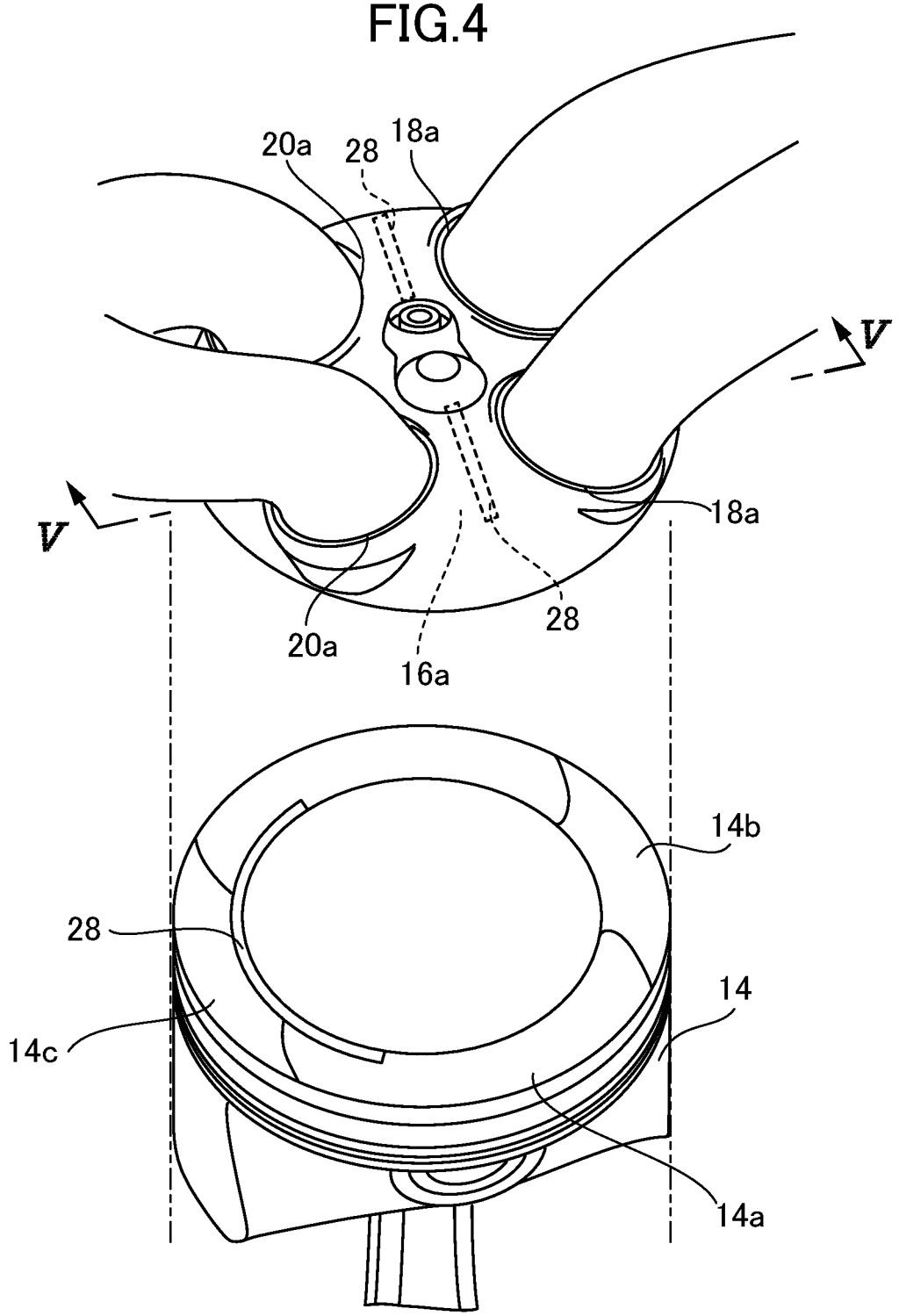
FIG. 4 is a perspective view depicting the arrangement of the plasma actuator in this embodiment.

Next, with reference to FIGS. 4 and 5, the plasma actuator 28 in this embodiment will be described in more detail. FIG. 4 is a perspective view depicting the arrangement of the plasma actuator 28 in this embodiment, and FIG. 5 is a sectional view taken along the line V-V in FIG. 4.

Figure 5:
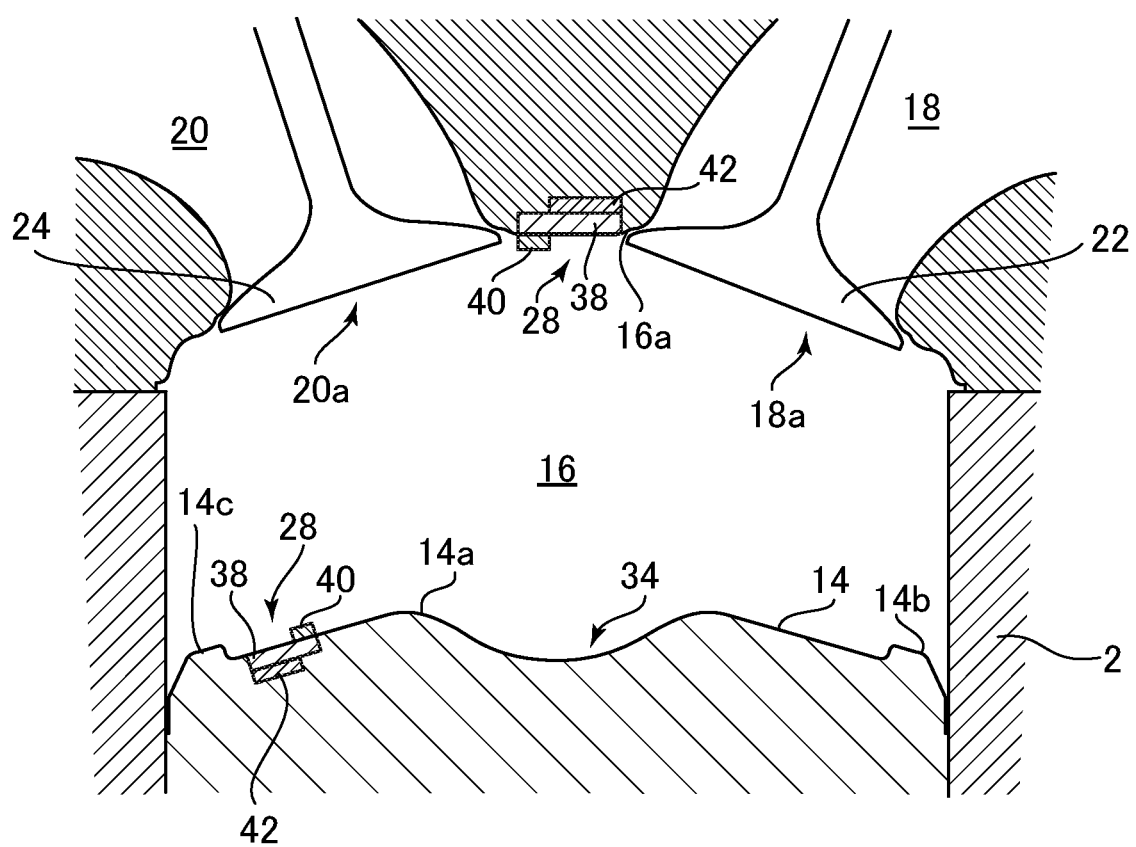
FIG. 5 is a sectional view depicting the arrangement of the plasma actuator in this embodiment, taken along the line V-V in FIG. 4.

As depicted in FIGS. 4 and 5, the plasma actuator 28 is installed on each of the combustion chamber ceiling surface 16*a* and the piston top surface 14*a*.

As depicted in FIG. 4, on the combustion chamber ceiling surface 16*a*, the plasma actuators 28 is formed in a linear shape and provided by a number of two, wherein each of the two linear-shaped plasma actuators 28 is arranged between a respective one of two sets of the intake opening 18*a* and the exhaust opening 20*a*, such that it extends in a radial direction of the combustion chamber 16*a*.

Specifically, as depicted in FIG. 5, in each of these plasma actuators 28, the dielectric body 38 is disposed along the ceiling surface 16*a*, in a region between the corresponding set of the intake opening 18*a* and the exhaust opening 20*a* (i.e., at a position closer to a center of the ceiling surface 16*a* than the intake opening 18*a*). Then, the exposed electrode 40 is disposed on one side of the dielectric body 38 facing the combustion chamber 16 (on a lower side of the dielectric body 38, in FIG. 5), and the embedded electrode 42 is embedded on a side opposite to the exposed electrode 40 across the dielectric body 38 (i.e., on the other side of the dielectric body 38 facing to the cylinder head 6, or on an upper side of the dielectric body 38, in FIG. 5). The embedded electrode 42 is disposed at a position closer to the intake opening 18*a* than the exposed electrode 40.

Further, on the piston top surface 14*a*, the plasma actuator 28 formed in an arc shape is provided between one end 14*c* of the piston top surface 14*a* on the side of the exhaust opening 20*a* and a peripheral edge of the cavity 34, such that it extends in a circumferential direction of the piston 14, as depicted in FIG. 4.

Specifically, as depicted in FIG. 5, in this plasma actuator 28, the dielectric body 38 is disposed along the piston top surface 14*a*. Then, the exposed electrode 40 is disposed on one side of the dielectric body 38 facing the combustion chamber (on an upper side of the dielectric body 38, in FIG. 5), and the embedded electrode 42 is embedded on a side opposite to the exposed electrode 40 across the dielectric body 38 (i.e., on the other side of the dielectric body 38 facing to the piston 14, or on a lower side of the dielectric body 38, in FIG. 5). The embedded electrode 42 is disposed at a position closer to the exhaust opening-side end 14*c* of the piston top surface 14*a*, than the exposed electrode 40.

Figure 6:
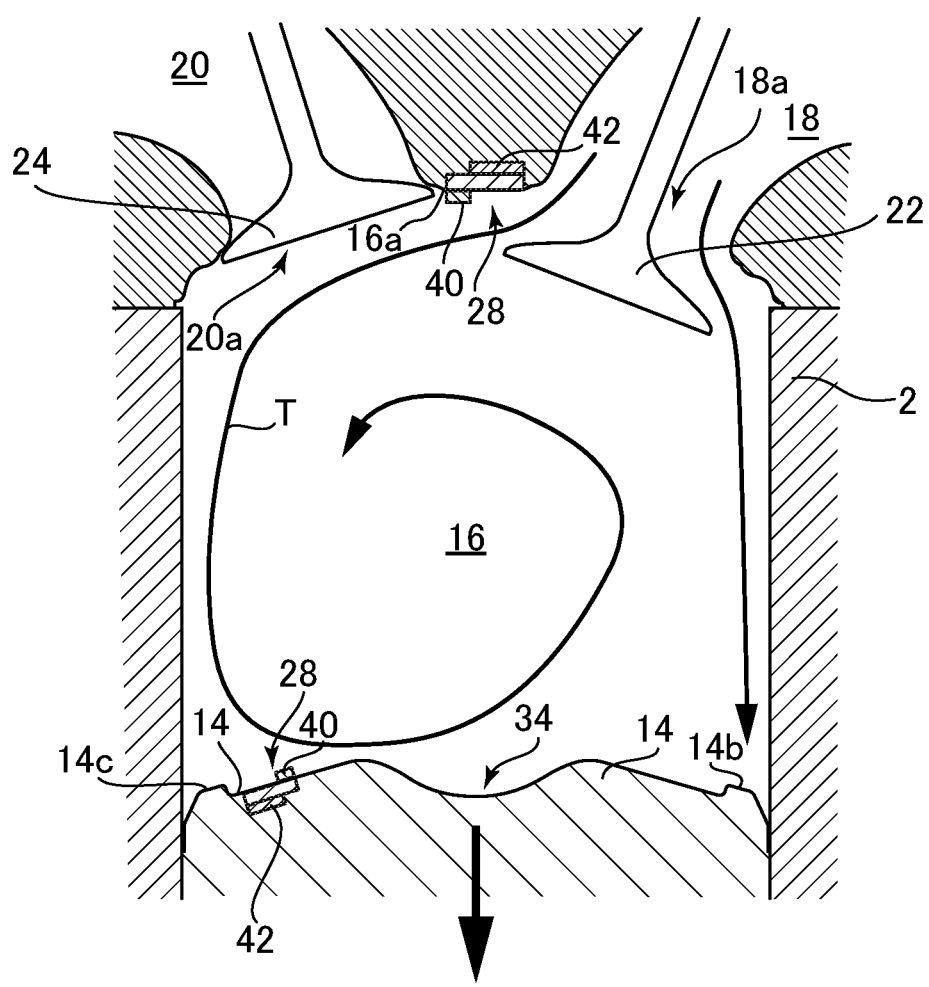
FIG. 6 is a sectional view depicting the operation of the plasma actuator in this embodiment during an intake stroke.
Figure 7A:
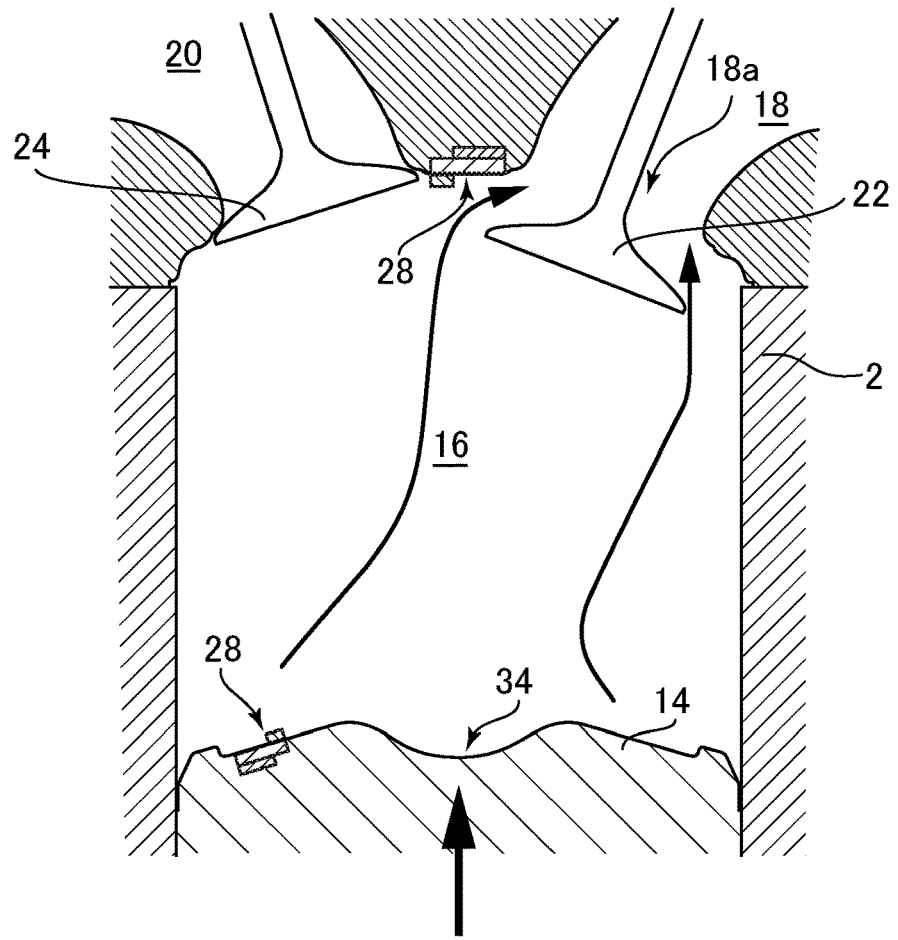
FIG. 7A is a sectional view depicting a flow inside a cylinder, in an early phase of a compression stroke of the engine in this embodiment.
Figure 7B:
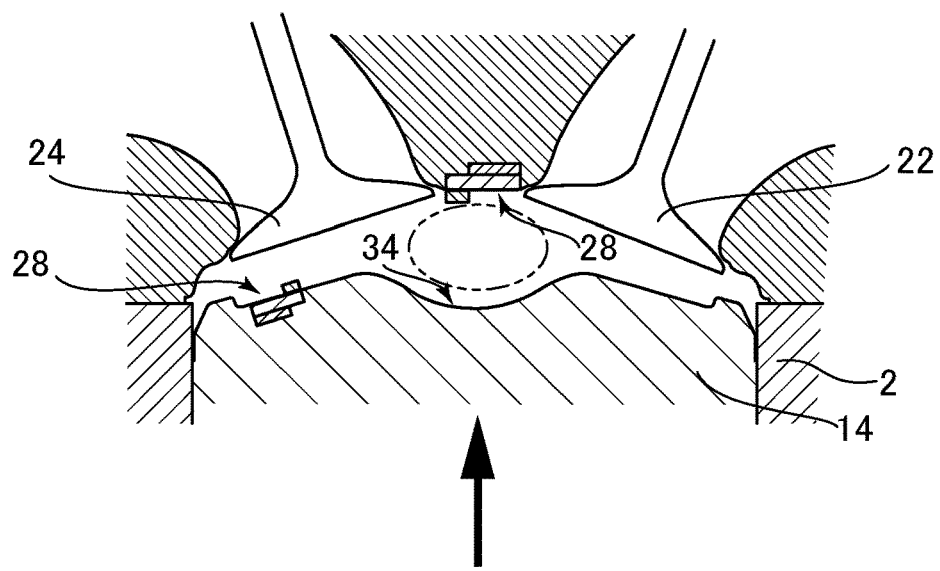
FIG. 7B is a sectional view depicting a flow inside the cylinder, at a timing around top dead center of a compression stroke of the engine in this embodiment.

Next, with reference to FIGS. 6, 7A and 7B, the operation of the plasma actuators 28 in this embodiment will be described. FIG. 6 is a sectional view depicting the operation of the plasma actuators 28 in this embodiment during an intake stroke. FIG. 7A is a sectional view depicting a flow inside one of the cylinders, in an early phase of a compression stroke of the engine in this embodiment, and FIG. 7B is a sectional view depicting a flow inside the cylinder, at a timing around top dead center of a compression stroke of the engine in this embodiment. More specifically, FIG. 7A exemplifies a case where the engine 1 is operated such that the intake valves 22 are closed after entering a compression stroke.

FIG. 6 depicts an internal state of the cylinder at a timing around bottom dead center of an intake stroke of the cylinder. As depicted in FIG. 6, during the intake stroke, intake air flows into the combustion chamber 16 through each of the intake ports 18 and a gap between corresponding ones of the intake openings 18*a* and the intake valves 22. In this process, intake air flows into the combustion chamber 16 from the intake opening 18*a* of the intake port 18 extending at an angle inclined with respect to a direction of the axis of the cylinder 2, in a direction toward the exhaust opening 20*a*, moves toward the piston 14 along a first region of an inner wall surface of the cylinder 2 on the side of the exhaust opening 20*a*, and after turning around to move along the piston top surface 14*a* in a direction toward the other, intake opening-side, end 14*b* of the piston top surface 14*a*, further moves upwardly toward the intake opening 18*a*, whereby a tumble flow T is formed. On the other hand, intake air flowing into the combustion chamber 16 from the intake opening 18*a*, in a direction opposite to the exhaust opening 20*a*, moves linearly and directly toward the piston 14 along a second region of the inner wall surface of the cylinder 2 on a side opposite to the exhaust opening 20*a*.

The intake air flowing into the combustion chamber 16 from the intake opening 18*a* in the direction toward the exhaust opening 20*a* has a flow rate greater than that of the intake air flowing into the combustion chamber 16 from the intake opening 18*a* in the direction opposite to the exhaust opening 20*a*, so that the tumble flow T is stronger than a flow flowing toward the piston 14 along the second region of the inner wall surface of the cylinder 2 on the side opposite to the exhaust opening 20*a*. Therefore, in a conventional engine, vortexes due to the tumble flow T still remain in a compression strike, causing an uneven distribution of an air-fuel mixture.

In this embodiment, in a period during which the tumble flow T is formed in the above manner (e.g., the entire period of an intake stroke), the PCM 32 operates to instruct the AC power supply 44 to apply a high-frequency and high-voltage AC voltage between the exposed electrode 40 and the embedded electrode 42 in each of the plasma actuators 28 installed on the combustion chamber ceiling surface 16*a* and the piston top surface 14*a*. Thus, a plasma is generated in the discharge space between the edge face of the exposed electrode 40 and the dielectric body 38, and, based on a body force produced by the plasma, a flow flowing along the combustion chamber ceiling surface 16*a* in a direction from the exposed electrode 40 toward the intake opening 18*a*, and a flow flowing along the piston top surface 14*a* in a direction from the exposed electrode 40 toward the exhaust ports-side end 14*c* of the piston top surface 14*a*, are induced. That is, in the vicinity of each of the combustion chamber ceiling surface 16*a* and the piston top surface 14*a*, a flow is generated in a direction causing the generated flow to cancel out the tumble flow T.

As a result, the tumble flow T is suppressed, and the strength thereof becomes approximately equal to that of the flow flowing along the second region of the inner wall surface of the cylinder 2 on the side opposite to the exhaust opening 20*a*, so that the two flows are cancelled out in an early phase of a compression stroke, leading to disappearance of vortexes, as depicted in FIG. 7A.

This makes it possible to moderate the flow rate of gas in the vicinity of the inner wall surface of the cylinder 2, thereby suppressing convection heat transfer between in-cylinder gas and the inner wall surface of the cylinder 2 to promote a rise in temperature of the in-cylinder gas during the compression stroke.

Further, in a last phase of the compression stroke, the PCM 32 operates to control the injector 26 to inject fuel toward the center of the cavity 34 of the piston top surface 14*a*. Here, a nozzle hole diameter, a fuel injection pressure, an injection timing, etc., of the injector are set such that a reachable distance of fuel injected from the injector 26 becomes less than a distance between the injector 26 and a wall surface of the cavity 34 (i.e., the injected fuel is disposed at a position spaced apart from the wall surface of the cavity 34 by a given distance). In this case, the compression stroke is progressed in a vortex-free state, so that an air-fuel mixture can be located in a central region of the cavity 34, at a timing around top dead center of the compression stroke. This makes it possible to reduce cooling loss due to convection heat transfer from high-temperature gas to the wall surface of the cavity 34.

Next, a modification of the above embodiment will be described.

The above embodiment has been described based on an example where the plasma actuator 28 is installed on each of the combustion chamber ceiling surface 16*a* and the piston top surface 14*a*. Alternatively, the plasma actuator 28 may be installed on either one of the combustion chamber ceiling surface 16*a* and the piston top surface 14*a*.

Next, advantageous effects of the in-combustion chamber flow control device according to the above embodiment of the present invention including the above modification will be described.

In the above embodiment, in the plasma actuator 28, the exposed electrode 40 is disposed on the combustion chamber-facing side of the dielectric body 38 disposed along the combustion chamber ceiling surface 16*a*, and the embedded electrode 42 is disposed on the side opposite to the exposed electrode 40 across the dielectric body 38, at a position closer to the intake opening 18*a* than the exposed electrode 40, so that it becomes possible to generate plasma in the discharge space between the edge face of the exposed electrode 40 and the dielectric bod 38*y*, by applying a high-frequency and high-voltage AC voltage between the exposed electrode 40 and the embedded electrode 42 during an intake stroke during which a tumble flow T is generated, and, based on a body force (volume force) produced by the plasma, induce a flow flowing along the combustion chamber ceiling surface 16*a* in a direction from the exposed electrode 40 toward the intake opening 18*a*. That is, it becomes possible to generate a flow in a direction causing the generated flow to cancel out a tumble flow T formed by intake air flowing from the intake opening 18*a* into the combustion chamber 16 toward the exhaust opening 20*a*, and thus, in a compression stroke, suppress vortexes due to the tumble flow T to moderate the flow rate of gas in the vicinities of an inner wall surface of the cylinder 2 and the piston top surface 14*a*, thereby suppressing convection heat transfer between in-cylinder gas and each of the inner wall surface of the cylinder 2 and the piston top surface 14*a* to promote a rise in temperature of the in-cylinder gas during the compression stroke.

Further, because the compression stroke is progressed in the state in which vortexes due to the tumble flow T are suppressed, an air-fuel mixture can be located in a central region of the combustion chamber 16 at a timing around top dead center of the compression stroke. This makes it possible to reduce cooling loss due to convection heat transfer from high-temperature gas to the wall surface of the combustion chamber 16 and the piston top surface 34, caused by the tumble flow T.

In the above embodiment, each of the exposed electrode 40 and the embedded electrode 42 is disposed to extend along the radial direction of the combustion chamber 16, in the region between the intake opening 18*a* and the exhaust opening 20*a*. Thus, by applying a high-frequency and high-voltage AC voltage between the exposed electrode 40 and the embedded electrode 42 during an intake stroke during which a tumble flow T is generated, a flow of intake air flowing from the intake opening 18*a* into the combustion chamber 16 toward the exhaust opening 20*a* can be suppressed over the entire combustion chamber ceiling surface 16*a*. This makes it possible to more effectively suppress vortexes due to the tumble flow T.

In the above embodiment, in the plasma actuator 28, the exposed electrode 40 is disposed on the combustion chamber-facing side of the dielectric body 38 disposed along the piston top surface 14*a*, and the embedded electrode 42 is disposed on the side opposite to the exposed electrode 40 across the dielectric body 38, at a position closer to the exhaust opening-side end 14*c* of the piston top surface 14*a* than the exposed electrode 40, so that it becomes possible to generate plasma in the discharge space between the edge face of the exposed electrode 40 and the dielectric body 38, by applying a high-frequency and high-voltage AC voltage between the exposed electrode 40 and the embedded electrode 42 during an intake stroke during which a tumble flow T is generated, and, based on a body force produced by the plasma, induce a flow flowing along the piston top surface 14*a* in a direction from the exposed electrode 40 toward the exhaust opening-side end 14*c* of the piston top surface 14*a*. That is, it becomes possible to generate a flow in a direction causing the generated flow to cancel out a tumble flow T flowing along the piton top surface 14*a* in a direction from the exhaust opening-side end 14*c* of the piston top surface 14*a* toward the other, intake opening-side, end 14*b* of the piston top surface 14*a*, and thus, in a compression stroke, suppress vortexes due to the tumble flow T to moderate the flow rate of gas in the vicinities of the inner wall surface of the cylinder 2 and the piston top surface 14*a*, thereby suppressing convection heat transfer between in-cylinder gas and each of the inner wall surface of the cylinder 2 and the piston top surface 14*a* to promote a rise in temperature of the in-cylinder gas during the compression stroke.

Further, because the compression stroke is progressed in the state in which vortexes due to the tumble flow T are suppressed, an air-fuel mixture can be located in the central region of the combustion chamber 16 at a timing around top dead center of the compression stroke. This makes it possible to reduce cooling loss due to convection heat transfer from high-temperature gas to the wall surface of the combustion chamber 16 and the piston top surface 34, caused by the tumble flow T.

In the above embodiment, each of the exposed electrode 40 and the embedded electrode 42 is disposed at a position closer to the exhaust opening-side end 14*c* of the piston top surface 14*a* than to the center of the piston top surface 14*a*, so that, by applying a high-frequency and high-voltage AC voltage between the exposed electrode 40 and the embedded electrode 42 during an intake stroke during which a tumble flow T is generated, a tumble flow turning around from the first region of the inner wall surface of the cylinder 2 on the side of the exhaust opening 20*a* toward the exhaust opening-side end 14c of the piston top surface 14a and then flowing along the piston top surface 14a toward the intake opening-side end 14b of the piston top surface 14a can be suppressed at a position where the tumble flow T has a relatively high flow rate. This makes it possible to more effectively suppress vortexes due to the tumble flow T.

In the above embodiment, the PCM 32 operates to control the plasma actuator 28 disposed along the combustion chamber ceiling surface 16a, at a position closer to the center of the ceiling surface 16a than the intake opening 18a, to generate a flow flowing along the combustion chamber ceiling surface 14a a direction from the plasma actuator 28 toward the intake opening 18a, during an intake stroke during which a tumble flow T is generated. Thus, it becomes possible to generate a flow in a direction causing the generated flow to cancel out a tumble flow T formed by intake air flowing from the intake opening 18a into the combustion chamber 16 toward the exhaust opening 20a, and thus, in a compression stroke, suppress vortexes due to the tumble flow T to moderate the flow rate of gas in the vicinities of the inner wall surface of the cylinder 2 and the piston top surface 14a, thereby suppressing convection heat transfer between in-cylinder gas and each of the inner wall surface of the cylinder 2 and the piston top surface 14a to promote a rise in temperature of the in-cylinder gas during the compression stroke.

Further, because the compression stroke is progressed in the state in which vortexes due to the tumble flow T are suppressed, an air-fuel mixture can be located in the central region of the combustion chamber 16 at a timing around top dead center of the compression stroke. This makes it possible to reduce cooling loss due to convection heat transfer from high-temperature gas to the wall surface of the combustion chamber 16 and the piston top surface 14a, caused by the tumble flow T.

In the above embodiment, the PCM 32 operates to control the plasma actuator 28 disposed along the piston top surface 14a to generate a flow flowing along the piston top surface 14a in a direction from the plasma actuator 28 toward the exhaust opening-side end 14c of the piston top surface 14a during an intake stroke during which a tumble flow T is generated. Thus, it becomes possible to generate a flow in a direction causing the generated flow to cancel out a tumble flow flowing along the piton top surface 14a in a direction from the exhaust opening-side end 14c of the piston top surface 14a toward the intake opening-side end 14b of the piston top surface 24a, and thus, in a compression stroke, suppress vortexes due to the tumble flow T to moderate the flow rate of gas in the vicinities of the inner wall surface of the cylinder 2 and the piston top surface 14a, thereby suppressing convection heat transfer between in-cylinder gas and each of the inner wall surface of the cylinder 2 and the piston top surface 14a to promote a rise in temperature of the in-cylinder gas during the compression stroke.

Further, because the compression stroke is progressed in the state in which vortexes due to the tumble flow T are suppressed, an air-fuel mixture can be located in the central region of the combustion chamber 16 at a timing around top dead center of the compression stroke. This makes it possible to reduce cooling loss due to convection heat transfer from high-temperature gas to the wall surface of the combustion chamber 16 and the piston top surface 14a, caused by the tumble flow T.

In the above embodiment, in the engine 1 configured such that fuel is injected toward the center of the cavity 34, the compression stroke is progressed in the state in which vortexes due to the tumble flow T are suppressed. Thus, an air-fuel mixture can be located in the center of the cavity 34 at a timing around top dead center of the compression stroke, so that it becomes possible to more reliably reduce the cooling loss due to convection heat transfer from high-temperature gas to a wall surface of the cavity 34 caused by the tumble flow.

In the above embodiment, injected fuel is disposed at a position spaced apart from the wall surface of the cavity 34 by a given distance, and the compression stroke is progressed in the state in which vortexes due to the tumble flow are suppressed. Thus, an air-fuel mixture can be located in the center of the cavity 34 at a timing around top dead center of the compression stroke, so that it becomes possible to more reliably reduce the cooling loss due to convection heat transfer from high-temperature gas to the wall surface of the cavity 34 caused by the tumble flow.

LIST OF REFERENCE SIGNS

1: engine (engine body)
14: piston
14a: piston top surface
14b: intake opening-side end
14c: exhaust opening-side end
16: combustion chamber
16a: combustion chamber ceiling surface
18a: intake opening
20a: exhaust opening
28: plasma actuator
32: PCM
34: cavity
38: dielectric body
40: exposed electrode
42: embedded electrode

The invention claimed is:

1. An in-combustion chamber flow control device used in an engine comprising a cylindrical cylinder, a piston received in the cylinder slidably with respect to an inner surface of the cylinder, and a cylinder head which is internally formed with an intake passage connected to an intake opening formed in a ceiling surface of a combustion chamber defined by the cylinder head, the cylinder and the piston, said intake passage being at an angle inclined with respect to a direction of an axis of the cylinder, wherein the in-combustion chamber flow control device is designed to control a flow of gas in the combustion chamber, the in-combustion chamber flow control device being characterized in that in-combustion chamber flow control device comprises a plasma actuator disposed inside the combustion chamber, the plasma actuator comprising: a dielectric body disposed along the ceiling surface at a position closer to a center of the ceiling surface than the intake opening; an exposed electrode disposed on one side of the dielectric body facing the combustion chamber; and an embedded electrode disposed on a side opposite to the exposed electrode across the dielectric body, the embedded electrode being disposed at a position closer to the intake opening than the exposed electrode.

2. The in-combustion chamber flow control device according to claim 1, wherein each of the exposed electrode and the embedded electrode is disposed to extend along a radial direction of the combustion chamber, in a region between the intake opening and an exhaust opening formed in the ceiling surface of the combustion chamber.

3. An in-combustion chamber flow control device used in an engine comprising a cylindrical cylinder, a piston received in the cylinder slidably with respect to an inner surface of the cylinder, and a cylinder head which is internally formed with an intake passage connected to an intake opening formed in a ceiling surface of a combustion chamber defined by the cylinder head, the cylinder and the piston, said intake passage being at an angle inclined with respect to a direction of an axis of the cylinder, wherein the in-combustion chamber flow control device is designed to control a flow of gas in the combustion chamber, the in-combustion chamber flow control device being characterized in that the in-combustion chamber flow control device comprises a plasma actuator disposed inside the combustion chamber, the plasma actuator comprising: a dielectric body disposed along a piston top surface of the piston of the engine; an exposed electrode disposed on one side of the dielectric body facing the combustion chamber; and an embedded electrode disposed on a side opposite to the exposed electrode across the dielectric body, the embedded electrode being disposed at a position closer to one end of the piston top surface on the side of an exhaust opening, than the exposed electrode.

4. The in-combustion chamber flow control device according to claim 3, wherein each of the exposed electrode and the embedded electrode is disposed at a position closer to the one end of the piston top surface on the side of the exhaust opening, than to a center of the piston top surface.

5. An in-combustion chamber flow control device used in an engine comprising a cylindrical cylinder, a piston received in the cylinder slidably with respect to an inner surface of the cylinder, and a cylinder head which is internally formed with an intake passage connected to an intake opening formed in a ceiling surface of a combustion chamber defined by the cylinder head, the cylinder and the piston, said intake passage being at an angle inclined with respect to a direction of an axis of the cylinder, wherein the in-combustion chamber flow control device is designed to control a flow of gas in the combustion chamber, the in-combustion chamber flow control device being characterized in that the in-combustion chamber flow control device comprises: a plasma actuator disposed along the ceiling surface of the combustion chamber, at a position closer to a center of the ceiling surface than the intake opening; and a control means to control the plasma actuator, wherein the control means is operable to control the plasma actuator to generate a flow flowing along the ceiling surface in a direction from the plasma actuator toward the intake opening, during an intake stroke of the engine.

6. An in-combustion chamber flow control device used in an engine comprising a cylindrical cylinder, a piston received in the cylinder slidably with respect to an inner surface of the cylinder, and a cylinder head which is internally formed with an intake passage connected to an intake opening formed in a ceiling surface of a combustion chamber defined by the cylinder head, the cylinder and the piston, said intake passage being at an angle inclined with respect to a direction of an axis of the cylinder, wherein the in-combustion chamber flow control device is designed to control a flow of gas in the combustion chamber, the in-combustion chamber flow control device being characterized in that the in-combustion chamber flow control device comprises: a plasma actuator disposed along a piston top surface of the piston of the engine; and a control means to control the plasma actuator, wherein the control means is operable to control the plasma actuator to generate a flow flowing along the piston top surface in a direction from the plasma actuator toward one end of the piston top surface on the side of an exhaust opening, during an intake stroke of the engine.

7. The in-combustion chamber flow control device according to claim 1, wherein the engine is provided with a fuel injection valve for injecting fuel directly into the cylinder, and a fuel injection valve control device for controlling the fuel injection valve to inject fuel toward a center of a cavity formed in the piston top surface in a downwardly concaved manner, and wherein the in-combustion chamber flow control device is designed to control a flow of gas in the combustion chamber.

8. The in-combustion chamber flow control device according to claim 7, wherein a reachable distance of fuel injected from the fuel injection valve is less than a distance between the fuel injection valve and a wall surface of the cavity.

* * * * *